(12) United States Patent
Grande et al.

(10) Patent No.: US 8,199,531 B2
(45) Date of Patent: *Jun. 12, 2012

(54) ISOLATED VOLTAGE CONVERTER WITH FEEDBACK ON THE PRIMARY WINDING, AND CORRESPONDING METHOD FOR CONTROLLING THE OUTPUT VOLTAGE

(75) Inventors: Michele Grande, Avola (IT); Salvatore Tumminaro, Marianopoli (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 739 days.

This patent is subject to a terminal disclaimer.

(21) Appl. No.: 12/324,062

(22) Filed: Nov. 26, 2008

(65) Prior Publication Data
US 2009/0175057 A1 Jul. 9, 2009

(30) Foreign Application Priority Data
Nov. 29, 2007 (IT) .............................. TO2007A0859

(51) Int. Cl.
*H02M 3/335* (2006.01)
*H02M 5/42* (2006.01)
*H02M 7/68* (2006.01)
*H02M 3/24* (2006.01)
*H02M 7/44* (2006.01)
(52) U.S. Cl. ...................... 363/21.01; 363/21.16; 363/97
(58) Field of Classification Search ................ 363/21.01, 363/21.08, 21.09, 21.1, 21.11, 21.16–21.18, 363/97; 330/127, 297
See application file for complete search history.

(56) References Cited

U.S. PATENT DOCUMENTS

| | | | |
|---|---|---|---|
| 4,975,823 A | 12/1990 | Rilly et al. | |
| 5,783,962 A | 7/1998 | Rieger | |
| 5,874,841 A | 2/1999 | Majid et al. | |
| 5,978,241 A * | 11/1999 | Lee | 363/73 |
| 6,122,180 A * | 9/2000 | Seo et al. | 363/21.17 |
| 6,445,598 B1 * | 9/2002 | Yamada | 363/21.12 |
| 6,894,910 B1 * | 5/2005 | Wu | 363/79 |
| 6,990,000 B1 | 1/2006 | Rodriguez et al. | |
| 7,525,819 B2 | 4/2009 | Choi | |
| 7,545,657 B2 | 6/2009 | Shimada et al. | |
| 7,561,446 B1 | 7/2009 | Vinciarelli | |
| 7,719,860 B2 | 5/2010 | Usui | |
| 7,859,859 B2 | 12/2010 | Clarkin | |

(Continued)

OTHER PUBLICATIONS

European Search Report for European Application No. EP08170303, European Patent Office, Munich, Oct. 18, 2010, pp. 3.

*Primary Examiner* — Jeffrey Sterrett
*Assistant Examiner* — Gary Nash
(74) *Attorney, Agent, or Firm* — Graybeal Jackson LLP

(57) ABSTRACT

An embodiment of a voltage converter includes: voltage-transformer means having a primary side, designed to receive an input voltage, and a secondary side, designed to supply an output voltage; control-switch means coupled to said primary side; and a control circuit, coupled to a control terminal of said control-switch means and designed to control switching thereof as a function of a first signal correlated to said output voltage; said control circuit being provided with an error-amplifier stage, designed to process a difference between said first signal and a reference signal, wherein said error-amplifier stage is configured so as to have a transconductance characteristic with a linear-operation region, having a given slope, and at least one first clamped region, which has a slope lower than said given slope and is contiguous to said linear-operation region.

40 Claims, 7 Drawing Sheets

U.S. PATENT DOCUMENTS

| | | |
|---|---|---|
| 2001/0033498 A1 | 10/2001 | Lee |
| 2001/0033501 A1 | 10/2001 | Nebrigic |
| 2003/0001548 A1 | 1/2003 | Feldtkeller |
| 2003/0206425 A1* | 11/2003 | Zhang .................. 363/127 |
| 2004/0080962 A1* | 4/2004 | Charych ................ 363/21.11 |
| 2004/0257839 A1 | 12/2004 | Yang et al. |
| 2005/0073862 A1* | 4/2005 | Mednik et al. ............ 363/20 |
| 2006/0050539 A1* | 3/2006 | Yang et al. ............ 363/21.16 |
| 2006/0152951 A1 | 7/2006 | Fagnani et al. |
| 2006/0209571 A1 | 9/2006 | Aso et al. |
| 2006/0250824 A1* | 11/2006 | Wekhande et al. ............ 363/20 |
| 2007/0047269 A1 | 3/2007 | Hachiya |
| 2008/0104432 A1 | 5/2008 | Vinayak |
| 2009/0086513 A1 | 4/2009 | Lombardo et al. |
| 2009/0140712 A1 | 6/2009 | Giombanco et al. |
| 2009/0141520 A1 | 6/2009 | Grande et al. |
| 2009/0147546 A1 | 6/2009 | Grande et al. |
| 2009/0175057 A1 | 7/2009 | Grande et al. |

* cited by examiner

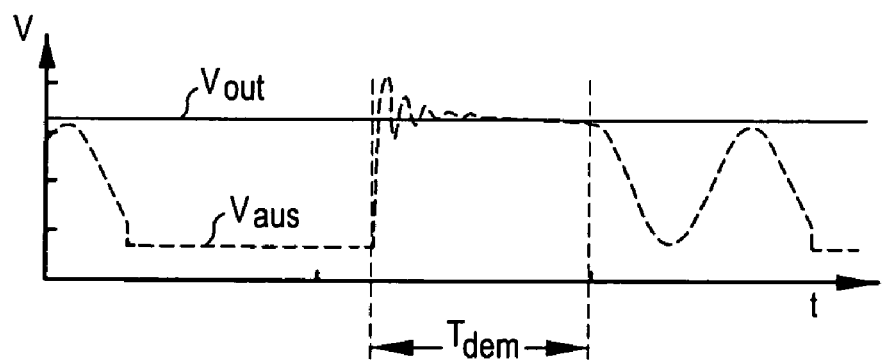
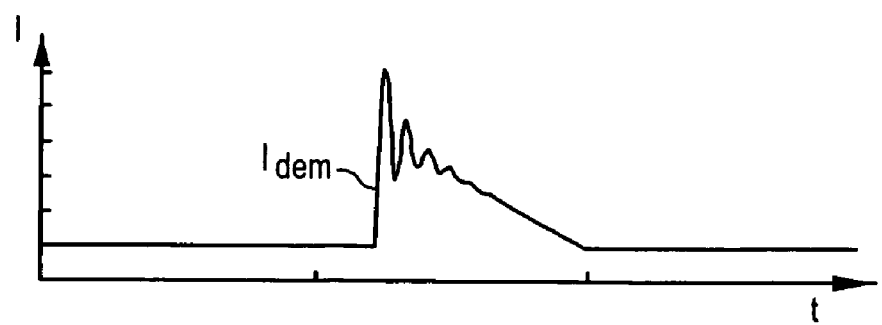

ISOLATED VOLTAGE CONVERTER WITH FEEDBACK ON THE PRIMARY WINDING, AND CORRESPONDING METHOD FOR CONTROLLING THE OUTPUT VOLTAGE

PRIORITY CLAIM

The present application claims the benefit of Italian Patent Application Serial No.: TO2007A000859, filed Nov. 29, 2007, which application is incorporated herein by reference in its entirety.

RELATED APPLICATION DATA

This application is related to the U.S. patent application Ser. Nos.: 12/324,194 entitled ISOLATED VOLTAGE CONVERTER WITH FEEDBACK ON THE PRIMARY WINDING, AND CORRESPONDING METHOD FOR CONTROLLING THE OUTPUT VOLTAGE, filed Nov. 26, 2008, application Ser. No. 12/324,548 entitled SELF-SUPPLY CIRCUIT AND METHOD FOR A VOLTAGE CONVERTER, filed Nov. 26, 2008 and application Ser. No. 12/324,412 entitled ISOLATED VOLTAGE CONVERTER WITH FEEDBACK ON THE PRIMARY WINDING AND PASSIVE SNUBBER NETWORK, AND CORRESPONDING CONTROL METHOD, filed Nov. 26, 2008 and which are incorporated herein by reference in their entireties.

TECHNICAL FIELD

An embodiment of the present disclosure relates to an isolated voltage converter with feedback on the primary winding, and to a corresponding method for controlling the output voltage. In particular, the ensuing treatment will refer, without this implying any loss of generality, to a switching converter of a flyback type, with PWM (Pulse Width Modulation) control.

BACKGROUND

Known to the art are voltage converters (or, in a similar way, regulators or power supplies) that have a galvanic insulation between an input voltage and a regulated output voltage, having a desired value, in which the galvanic insulation is obtained via a transformer having a primary side receiving the input voltage, and a secondary side supplying the regulated output voltage. Generally used are two techniques for controlling these voltage converters, which envisage a feedback either on the secondary side or on the primary side of the transformer. In the first case, a feedback voltage is taken directly on a secondary winding of the transformer, in parallel to the output, and sent to a regulation circuit via an optocoupler device so as to maintain the galvanic insulation. In the second case, the feedback voltage is taken generally on an auxiliary winding, purposely provided on the primary side of the transformer. The feedback on the primary side makes it possible to avoid the use of external isolation devices (for example, additional optocouplers or transformers), but may entail higher levels of consumption and hence a degradation in the regulation efficiency.

A wide range of control techniques has been proposed for implementing an efficient voltage regulation with feedback from the primary winding, but so far none of these has proven altogether satisfactory.

In particular, it has been proposed to use a purposely provided sample-and-hold device for sampling the feedback voltage on the auxiliary winding at the end of demagnetization of the transformer, i.e., when the value of this voltage corresponds to the value of the output voltage, constituting, in a know way, a faithful replica thereof.

In detail, and as is shown in FIG. 1, a voltage converter 1, of a flyback isolated type with control of the peak current and feedback on the primary winding, has a first input terminal $IN_1$ and a second input terminal $IN_2$, which are designed to receive an input voltage $V_{in}$, for example, from a voltage generator 2, and a first output terminal $OUT_1$ and a second output terminal $OUT_2$, between which an output capacitor 3 is coupled and an output voltage $V_{out}$ with regulated value is present. The voltage converter 1 supplies to a load an output current $I_{out}$.

The voltage converter 1 comprises a transformer 4, having a primary side and a secondary side, which is electrically isolated from the primary side, and having a primary winding 5, a secondary winding 6, and an auxiliary winding 7 (the latter positioned on the primary side of the transformer 4). For example, the transformer 4 has a turn ratio N between the primary winding 5 and the secondary winding 6, and a unit turn ratio between the secondary winding 6 and the auxiliary winding 7 (N:1:1). The primary winding 5 has a first terminal, which is coupled to the first input terminal $IN_1$, and a second terminal, which is coupled to a control switch 8, which can be actuated for controlling PWM operation of the voltage converter 1. The secondary winding 6 has a respective first terminal, which is coupled to the first output terminal $OUT_1$, via the interposition of a first rectifier diode 9, and a respective second terminal, which is coupled to the second output terminal $OUT_2$. The auxiliary winding 7 has a respective first terminal, present on which is an auxiliary voltage $V_{aus}$ and which is coupled to a resistive divider 10, and a respective second terminal, which is coupled to the reference potential.

The control switch 8, for example a power MOS transistor, has a first conduction terminal, which is coupled to the primary winding 5, a second conduction terminal, which is coupled to the reference potential, via the interposition of a sense resistor 11, and a control terminal, which is coupled to a control circuit 12, designed to control PWM operation of the voltage converter 1.

The resistive divider 10 comprises a first resistor 13 and a second resistor 14, which are coupled in series between the first terminal of the auxiliary winding 7 and the reference potential and define an intermediate node 15 on which a feedback signal $V_{fb}$ is present.

The voltage converter 1 further comprises a self-supply capacitor 16 coupled to the auxiliary winding 6 via the interposition of a second rectifier diode 17 and is designed to supply, in a known way, a self-supply voltage $V_{cc}$ to the control circuit 12 during the demagnetization phase of the transformer 4.

In detail, the control circuit 12 has a first input 12a, which is coupled to the intermediate node 15 and receives the feedback signal $V_{fb}$, a second input 12b which is coupled to the sense resistor 11 and receives a sense voltage $V_s$, and an output 12c, which is coupled to the control terminal of the control switch 8 and supplies a driving signal PW.

The control circuit 12 comprises: a sampling stage 20, which is coupled to the first input 12a and supplies at output a sampled signal $V_{cam}$, which is the result of the sample and hold (for example, performed at each switching cycle) of the feedback signal $V_{fb}$ at the end of the demagnetization phase; an error-amplifier stage 22, having a first input terminal, which is coupled to the output of the sampling stage 20 and receives the sampled signal $V_{cam}$, a second input terminal, which is coupled to a reference generator 23 and receives a reference voltage $V_{ref}$ the value of which is a function of a desired value of the regulated output voltage $V_{out}$, and an output terminal, which is coupled to an external compensation network 24 (represented schematically in FIG. 1 by a load impedance). A voltage control signal $V_{con}$ is consequently present on the output terminal of the error-amplifier stage 22.

The control circuit 12 further comprises a controller stage 25, having a first input terminal, which is coupled to the output of the error-amplifier stage 22 and receives the control signal $V_{con}$, a second input terminal, which is coupled to the second input 12b and receives the sense signal $V_s$, and an output terminal, which is coupled to the output 12c of the control circuit 12 and supplies the driving signal PW. In greater detail, the controller stage 25 comprises a comparator 28, designed to compare the control signal $V_{con}$ with the sense voltage $V_s$, and a PWM generator block 29, which is cascaded to the comparator 28 and is designed to generate the driving signal PW as a function of the result of the comparison.

There now follows a brief description of the general operation of the voltage converter 1 illustrated above.

Given the absence of an optocoupler between the secondary side of the transformer 4 and the control circuit 12, the value of the output voltage $V_{out}$ is read from the auxiliary winding 7, via the resistive divider 10 upstream of the second rectifier diode 17. In the ideal case of absence of leakage inductances and of parasitic resistances of the transformer 4 and of the wires, and assuming the voltage drop on the first rectifier diode 9 to be negligible, the auxiliary voltage $V_{aus}$ taken on the auxiliary winding 7 is proportional to the output voltage $V_{out}$ during the period in which, between one switching cycle and the next, the first rectifier diode 9 is in conduction, basically for the entire duration of demagnetization of the transformer 4. In actual fact, due to the leakage inductances and the equivalent resistance on the secondary winding of the transformer 4, a damped oscillation is superimposed on the useful signal of the auxiliary voltage $V_{aus}$; this oscillation causes the auxiliary voltage $V_{aus}$ to be a faithful replica, but for the turn ratio of the transformer 4, of the output voltage $V_{out}$ only at the instant in which the demagnetization of the transformer 4 is concluded. In fact, in this instant of time the current on the secondary winding is zero, and hence the equivalent resistance on the secondary winding has no effect, and moreover the oscillations due to the leakage inductances have ended (assuming that the demagnetization time is sufficiently long). The plot of the output signal $V_{out}$ and of the auxiliary voltage $V_{aus}$ is shown in FIG. 2a, where the demagnetization period is designated by $T_{dem}$. FIG. 2b shows the corresponding plot of the demagnetization current $I_{dem}$, which goes to zero at the end of the demagnetization period $T_{dem}$.

The sampling stage 20 is consequently configured to sample the feedback signal $V_{fb}$ exactly at the instant of demagnetization of the transformer 4, in such a way that the sampled signal $V_{cam}$ will coincide, but for the turn ratio of the transformer 4 and the dividing ratio of the resistive divider 10, with the output voltage $V_{out}$.

The difference between the reference signal $V_{ref}$ which represents the value of the output voltage to be regulated, and the sampled signal $V_{cam}$ constitutes the error signal $V_e$ at input to the error-amplifier stage 22. In addition, the output of the error-amplifier stage 22, appropriately compensated so as to obtain the desired closed-loop transfer function, constitutes the signal, which, at input to the controller stage 25 determines the current peak on the primary winding, and hence the switching-on time of the power switch 8 (in PWM mode). In particular, the controller stage 25 charges the magnetization inductance of the transformer 4 with an energy proportional to the square of the peak current.

The main limit of the system for regulation of the output voltage $V_{out}$ described above is represented by the difficulty of ensuring a same effectiveness of regulation in a wide range of values of the output current, and an adequate response to the load transients. In particular, a correct regulation of the output voltage $V_{out}$ is impaired by the error inevitably present on the sampled signal $V_{cam}$ especially at low loads, as a consequence of sampling occurring in the presence of the aforementioned oscillatory phenomenon.

SUMMARY

Embodiments of the present disclosure include a voltage converter and a corresponding method for controlling the regulated output voltage, which will enable the aforementioned disadvantages and problems to be overcome at least in part.

An embodiment of the present disclosure stems from the recognition of a series of problems linked to the voltage converter/described above with reference to the known art.

In particular, in order to sample the exact value of the voltage on the auxiliary winding 7 (reference may once again be made to FIG. 1) at the instant of demagnetization of the transformer 4, the sampling stage 20 has an equivalent time constant that is small with respect to the switching period. The sampling of the auxiliary voltage $V_{aus}$ in the presence of the noise represented by the oscillations may introduce high-frequency harmonics in the system. These oscillations are all the more significant the more the current load of the output is decreased. Assuming in fact constant output and input voltages, as the output current $I_{out}$ decreases, the system reacts so as to lower the peak current, with consequent decrease in the demagnetization time of the transformer 4; the effect of the high-frequency oscillation on the useful signal at the instant of sampling may be consequently greater.

On the other hand, the use of a greater time constant in the sampling operation could impair the correctness of the reading operation, in so far as it could alter the useful signal read by the sampling stage 20 at the instant of sampling. In addition, by applying a more stringent compensation of the control loop the effect of the high-frequency harmonics would be attenuated, but also the response of the system to sudden variations of the load would be limited in an undesirable way.

The negative effects of the noise on the sampled signal $V_{cam}$ may be further enhanced in the error-amplifier stage 22.

In this regard, FIG. 3a shows the typical plot of the transconductance characteristic of the error-amplifier stage 22 (i.e., the plot of the output current, designated by $I'_{out}$, as a function of the voltage at input to the stage, designated by $V_e$), comprising a central region (centred with respect to the origin) of linear operation, designated by L, and two side regions of large-signal operation, designated by $H_1$, $H_2$, which are laterally adjacent to the linear-operation region L (large-signal operation envisages, in a known way, a high output current, higher, in absolute value, than the current envisaged in linear operation, and cannot be approximated with linear functions). In particular, it should be noted the marked slope of the characteristic (i.e., the high value of transconductance) for positive input voltages $V_e$, outside the linear-operation region L.

FIG. 3b shows the plots of the sampled signal $V_{cam}$, the control signal $V_{con}$, and the feedback signal $V_{fb}$ in the case of a voltage converter sized so as to supply a power of 10 W, with an output voltage $V_{out}$ of 12.5 V, for a load having a current of 20 mA (and load resistance of 600Ω). As may be noted, with the above load values, the system enters a low-consumption operating mode, defined as "burst-mode" condition, when this kind of operation is not in actual fact required by the conditions of load. In a known way, the burst-mode condition arises, in fact, in the presence of a very low output load. In order to reduce the power consumption of the voltage converter, the PWM generator block 29 controls the control switch 8 with a switching frequency much lower than the one used in the condition of normal load and ordinary operation (for example, with a frequency of 1 kHz, instead of 50 kHz). The switching pulses supplied to the control terminal of the control switch 8 are hence spaced further apart in time. In a per-se known manner that is not described in detail herein, the control circuit 12 is configured so as to enter the burst-mode condition when the control signal $V_{con}$ has a given relation with a burst-mode reference signal (corresponding to a preset output power and indicating a condition of normal operation of the voltage converter).

This behavior is due to the fact that, as the load current decreases, the demagnetization time reduces, and the residual oscillation is not sufficiently damped. Consequently, the differences in the value of the sampled voltage (sampled signal $V_{cam}$) between one sampling and the next lead the error-amplifier stage 22 to work outside of the linear region, where the transconductance is much higher than in the linear region, causing large variations of the control voltage $V_{con}$, and onset in the control loop of phenomena of instability and loss of the voltage regulation.

In detail, in conditions of medium-to-low load, the mean value of the control voltage $V_{con}$ is close to the value of the aforesaid burst-mode reference signal, and the oscillations of the control voltage $V_{con}$ may cause the system to enter erroneously the burst-mode condition. In the very next switching cycle, the output voltage $V_{out}$ will drop in an anomalous way, in so far as the converter has not supplied at output a sufficient energy. At the next switching cycle, the control circuit 12 will realize the occurrence of the error (because the sampled signal $V_{cam}$ will be lower than the reference voltage $V_{ref}$) and will hence react even more abruptly than in the previous cycle, causing an even greater unbalancing of the control signal $V_{con}$. This situation will repeat in the next switching cycles until the error-amplifier stage 22 is taken out of the linear region, where the transconductance is higher, as described above. At this point, the voltage converter will work between these two extreme conditions, one with a low value of the control signal $V_{con}$ and one with a high value of the same control signal $V_{con}$, as highlighted in FIG. 3b. Basically, in particular in conditions of medium-to-low load, the control loop further amplifies the excursions of voltage of the control signal $V_{con}$, leading the voltage converter to work in high-energy bursts. This anomalous behavior may cause, in addition to the problems highlighted previously, also the emission of acoustic noise from the transformer 4, due to the succession of energy peaks that follow one another at sound frequency.

BRIEF DESCRIPTION OF THE DRAWINGS

One or more embodiments of the disclosure are now described, purely by way of non-limiting example and with reference to the attached drawings, in which:

FIGS. 2a, 2b and 3a, 3b show plots of some electrical quantities in the voltage converter of FIG. 1;

DETAILED DESCRIPTION

Figure 4:
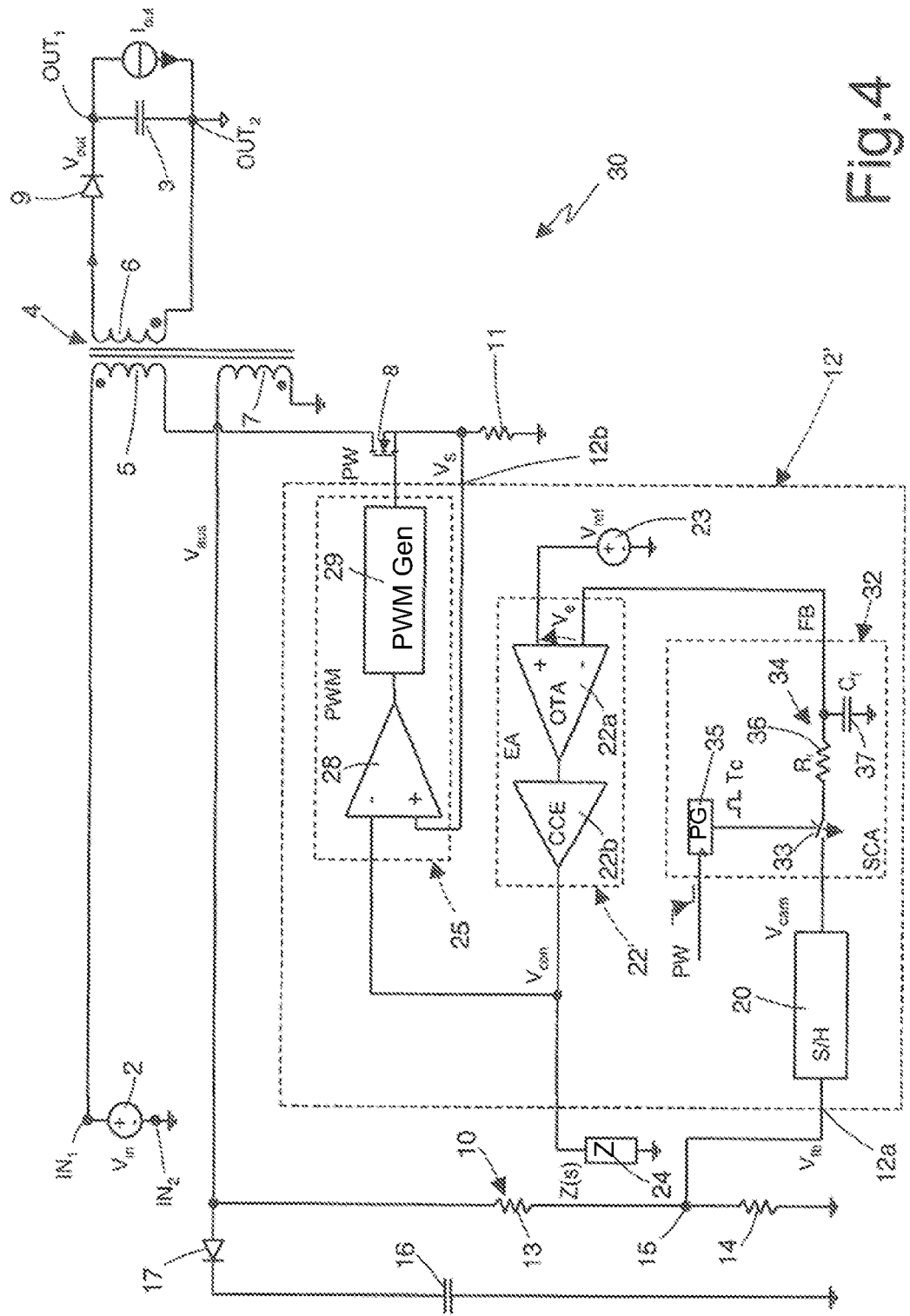
FIG. 4 shows a circuit diagram of a voltage converter according to an embodiment of the present disclosure.

FIG. 4 shows the circuit diagram of a voltage converter 30, made according to an embodiment of the present disclosure. Elements that are similar to the ones described previously are designated by the same reference numbers and are not described again.

Figure 1:
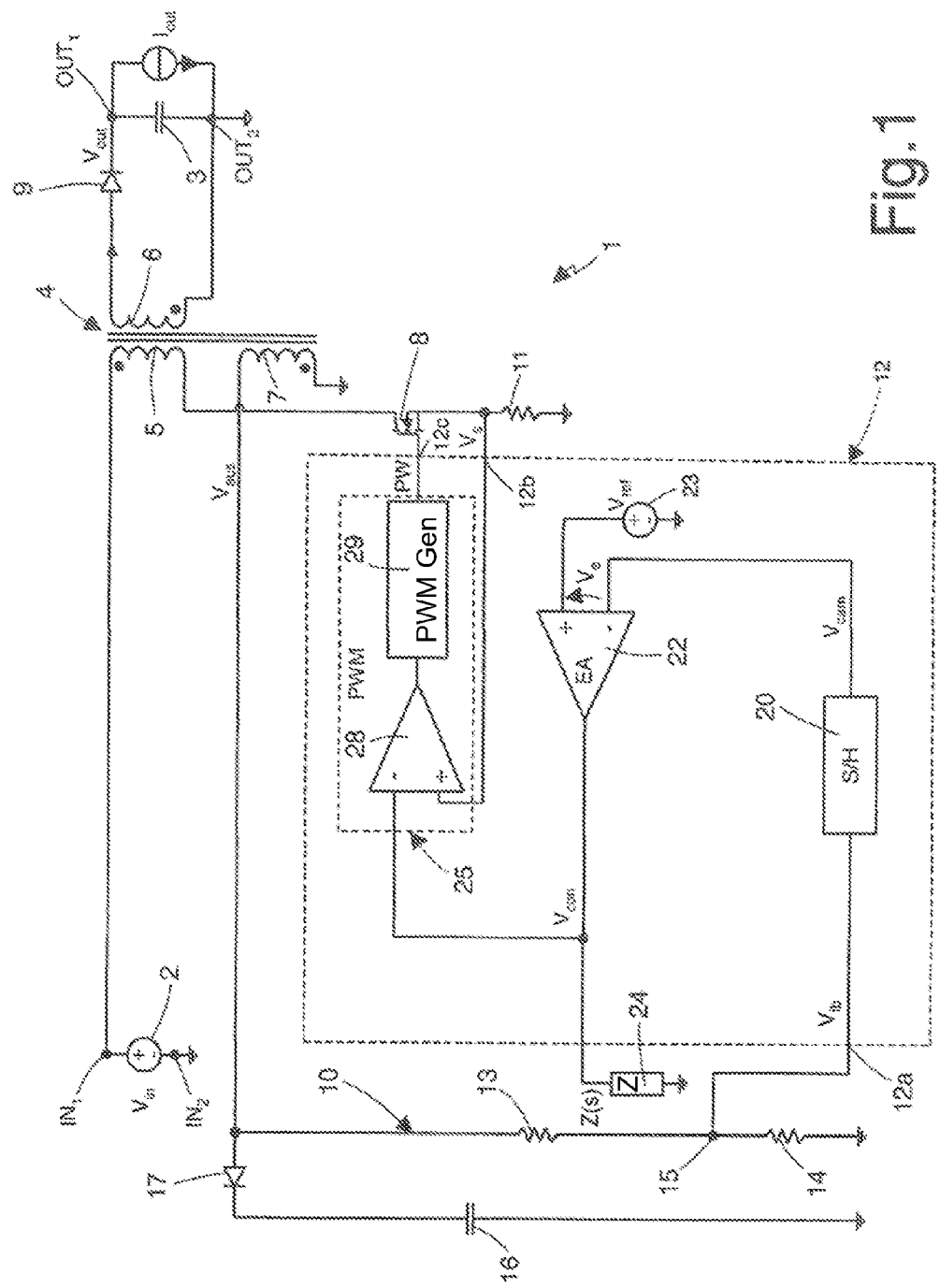
FIG. 1 shows a circuit diagram of a voltage converter of a known type.

In particular, this circuit diagram differs from that of the voltage converter/shown in FIG. 1 for the presence of an averager stage 32 set between the output of the sampling stage 20 and the first input terminal of the error-amplifier stage, here designated by 22'. The averager stage 32 receives from the sampling stage 20 the sampled signal $V_{cam}$ (which is the result of sampling, at the end of the demagnetization step, of the division of the auxiliary voltage $V_{aus}$), and supplies at output a filtered signal FB. The averager stage 32 enables attenuation of the problem of the sampling errors, performing an appropriate low-pass filtering of the sampled signal $V_{cam}$. In particular, it averages the current output of the sampling stage 20 with the outputs sampled and held at the previous sampling intervals, so as to limit the effects of the variations of the sampled signal $V_{cam}$ between one sampling cycle and the subsequent ones. For this purpose, an appropriate time constant is used, for example, of the same order of magnitude as the switching period of the voltage converter 30, which is effective for rendering the system substantially immune against the sampling errors and at the same time is not too stringent as regards the updating delay of the filtered signal FB, introduced by the filtering operation.

In the embodiment of FIG. 4, the averager stage 32 is a switched-capacitor (SC) filter, and comprises: a filtering switch 33, an RC-series stage 34, and a pulse generator 35. In detail, the filtering switch 33 is coupled between the output of the sampling stage 20 and the RC-series stage 34, and has a control terminal, which is coupled to the output of the pulse generator 35 and receives a command signal having pulses with pulse duration $T_c$. The RC-series stage 34 comprises a filter resistor 36, having a value of resistance $R_f$, coupled between the filtering switch 33 and the first input of the error-amplifier stage 22', and a filter capacitor 37, having a value of capacitance $C_f$, coupled between the aforesaid first input of the error-amplifier stage 22' and the reference potential. The pulse generator 35 receives at input the driving signal PW (which in addition controls the control switch 8), and is driven by the falling edge of the same driving signal PW, and supplies the command signal having the desired pulse duration $T_c$.

At each switching cycle, the filtering switch 33 is closed for a period of time equal to the pulse duration $T_c$, during which the sampled signal $V_{cam}$ is filtered by the RC-series stage 34 with filter time constant $T_f = R_f C_f$. Given that the filtering operation is carried out at each switching cycle of the control switch 8, the equivalent time constant $T_{eq}$ of the averager stage 32 is equal to $T_{sw} \cdot T_f / T_c$, where $T_{sw}$ is the switching period of the control switch 8. Consequently, by appropriately sizing the RC-series stage in such a way that the relation $T_f \geq T_c$ is satisfied, an equivalent time constant $T_{eq}$ is obtained, which is greater than or equal to the switching period $T_{sw}$ ($T_{eq} \geq T_{sw}$), consequently enabling an effective filtering and an effective immunity to the oscillations on the feedback signal. For example, the value of the resistance $R_f$ and of the capacitance $C_f$ can be chosen in such a way that the relation $T_f = 4 \cdot T_c$ is satisfied, and the equivalent time constant $T_{eq}$ is equal to a multiple of the switching period $T_{sw}$. In particular, the aforesaid relation $T_{eq} \geq T_{sw}$ enables implementation of an effective filtering of the sampled signal $V_{cam}$. Clearly, the maximum value of the equivalent time constant $T_{eq}$ is chosen in such a way as not to jeopardize the desired total closed-loop bandwidth of the control circuit, here designated by 12', and the corresponding stability in frequency (for example, the bandwidth is chosen equal to one fourth of the maximum switching frequency). For example, this maximum value may be chosen in such a way that the pole in frequency introduced by the averager stage 32 will not fall within the aforesaid total closed-loop bandwidth of the control circuit 12'.

According to an embodiment of the present disclosure, the error-amplifier stage 22' comprises an operational transconductance amplifier (OTA) 22a, designed to amplify an error signal $V_e$ constituted by the difference between the filtered signal FB and the reference signal $V_{ref}$, and a current-capability-enhancement block 22b (designated in what follows as CCE block), cascaded to the transconductance amplifier 22a and designed to increase the value of the maximum source and sink current thereof in order to reduce the system response times in the case of sudden load variations (so-called load transients).

Figure 5A:
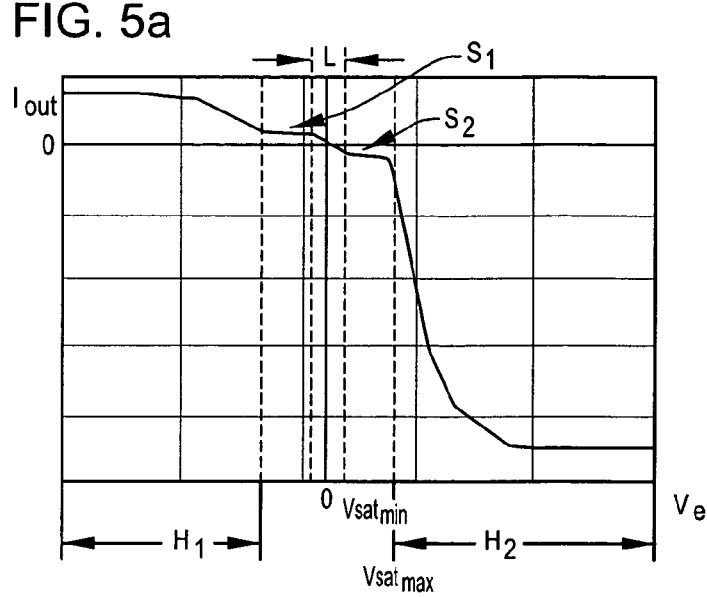
FIGS. 5a, 5b show the plot of some electrical quantities in the voltage converter of FIG. 4.

In particular, the transconductance amplifier 22a is in this case configured (as will be described in detail hereinafter) in such a way as to modify the static transconductance characteristic of the error-amplifier stage 22', as shown in FIG. 5a.

Figure 3A:
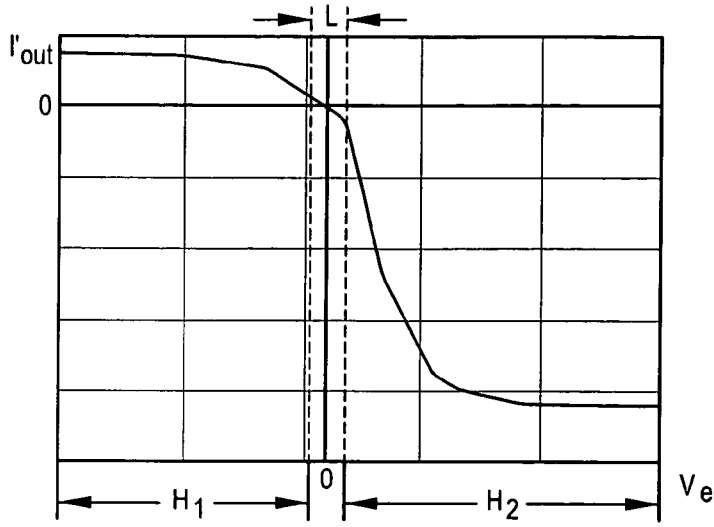

In detail, the linear-operation region, once again designated by L, is in this case separated from each of the two large-signal-operation regions $H_1$, $H_2$ (compare said characteristic with the one shown in FIG. 3a) by a respective saturation region (clamped region) $S_1$, $S_2$, a corresponding slope (or value of transconductance) of which is zero, or in any case much lower, for example approximately ten times lower, than the slope (or value of transconductance) of the linear-operation region L. In particular, in the clamped regions, the current $I'_{out}$ at output from the error-amplifier stage 22' is substantially constant. The width of the clamped regions $S_1$, $S_2$ is appropriately selected so as to improve the effectiveness of regulation of the voltage converter 30 and to prevent the error-amplifier stage 22' from working outside of the linear region L within the large-signal-operation regions $H_1$, $H_2$, where the transconductance is much higher (in the example shown in FIG. 5a, the linear region L has a width of approximately 25 mV, whilst the clamped regions $S_1$, $S_2$ each have a width of approximately 70 mV, hence approximately three times higher).

Figure 3B:
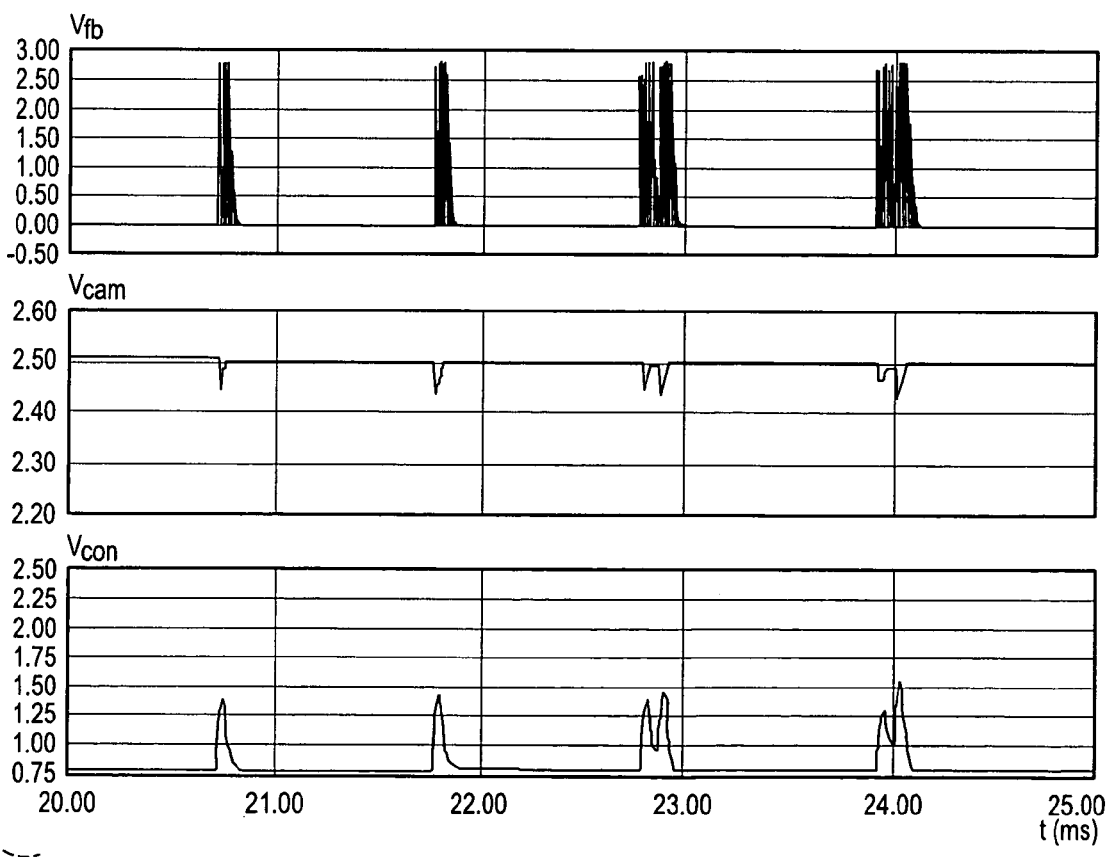
Figure 5B:
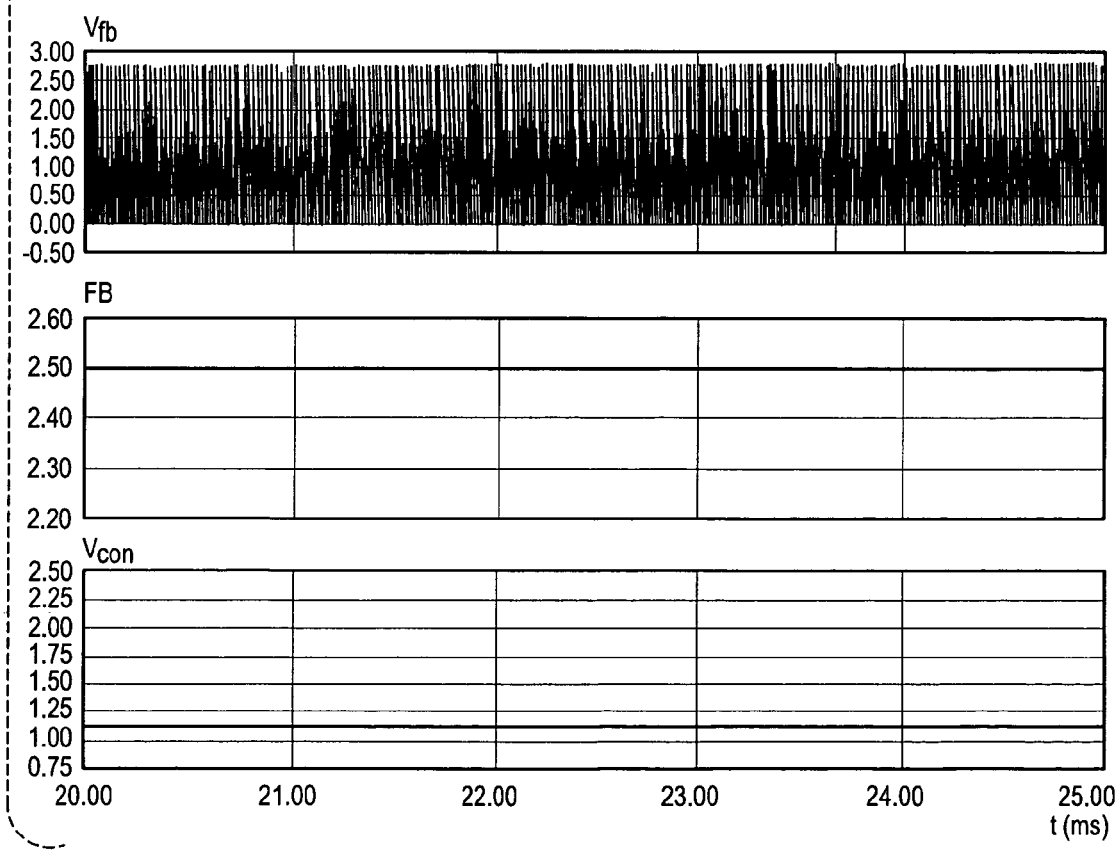

FIG. 5b (to be compared with the previous FIG. 3b) shows the plots of the filtered signal FB, of the control signal $V_{con}$, and of the feedback signal $V_{fb}$ in the same operating conditions as the ones described for FIG. 3b, with Tf=4·Tc. As may be noted, the control circuit 12' correctly regulates the value of the output voltage $V_{out}$ without going into burst mode. In fact, the source and sink currents of the error-amplifier stage 22' have a very limited variability in the clamped regions $S_1$, $S_2$ of the transconductance characteristic, and the possible variations of the filtered signal FB between one sampling cycle and the next do not cause sudden variations of the control signal $V_{cen}$, consequently not generating instability in the control loop.

Figure 6:
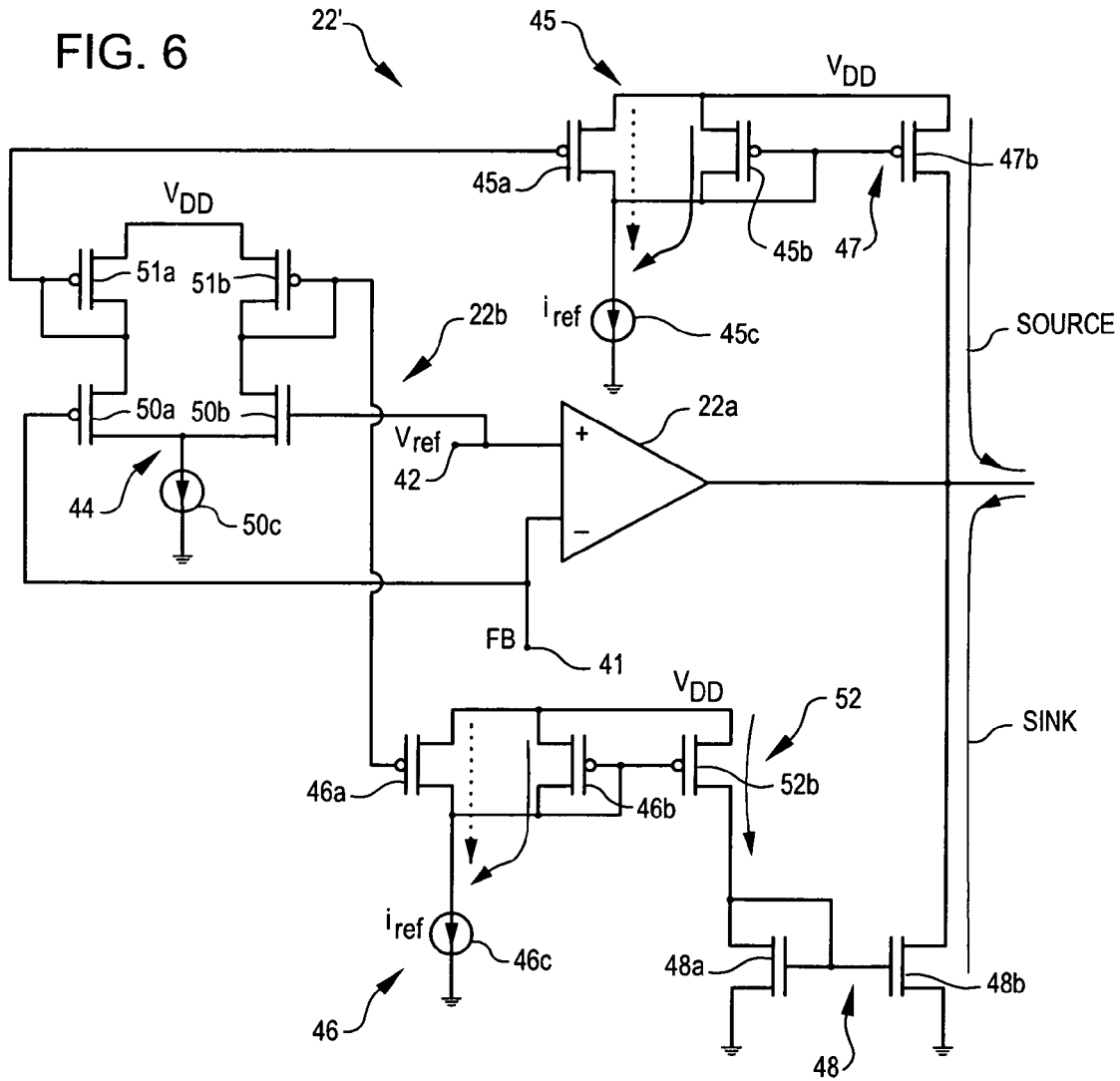
FIG. 6 shows a detailed circuit diagram of an error-amplifier stage of the voltage converter of FIG. 4, according to an embodiment of the present disclosure.
Figure 7:
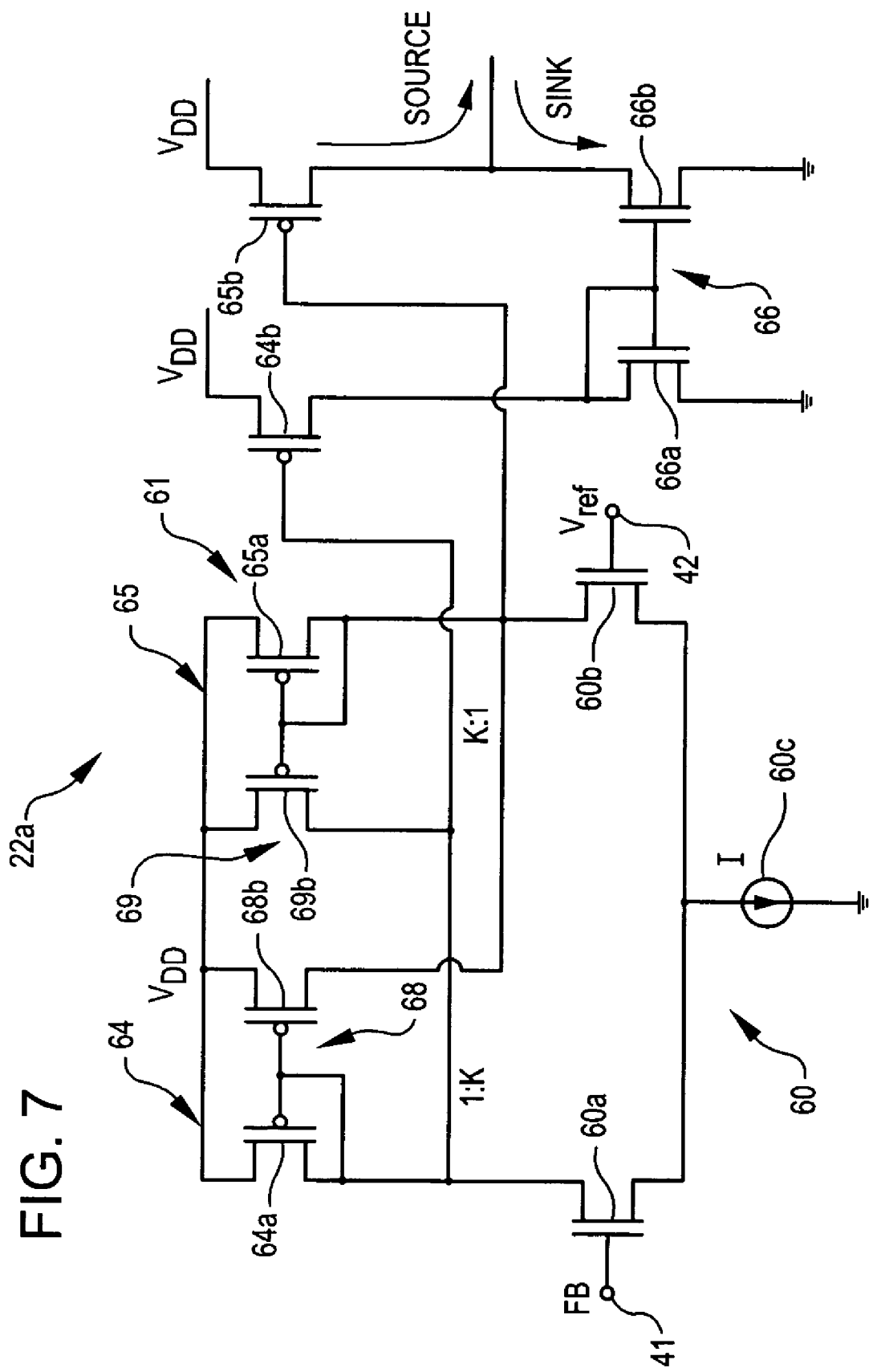
FIG. 7 shows a detailed circuit diagram of a transconductance amplifier block of the error-amplifier stage of FIG. 6.

FIGS. 6 and 7 show a possible circuit embodiment of the error-amplifier stage 22', configured to provide the modified transconductance characteristic of FIG. 5a. The error-amplifier stage 22' has a first input terminal 41, which is coupled to the output of the averager stage 32 and receives the filtered signal FB, and a second input terminal 42, which is coupled to the reference generator 23 and receives the reference signal $V_{ref}$.

The error-amplifier stage 22' comprises: the transconductance amplifier 22a (shown separately in FIG. 7, for clarity of illustration), having an inverting input coupled to the first input terminal 41, a non-inverting input coupled to the second input terminal 42, and an output, which is coupled to the output terminal of the error-amplifier stage 22' and is designed to amplify the error signal $V_e$ constituted by the difference between the filtered signal FB and the reference signal $V_{ref}$, as well as to determine the desired value of transconductance in the linear-operation region L, the extension of the same linear-operation region L and the slope of the clamped regions $S_1$, $S_2$; and the CCE block 22b (described in detail in FIG. 6, and no longer represented in FIG. 7), operatively coupled to the transconductance amplifier 22a, in order to increase the current capacity of the output stage, according to the desired transconductance characteristic, so as to define the large-signal-operation regions $H_1$, $H_2$.

In greater detail, the CCE block 22b comprises: a first differential input stage 44, a first current-shifter stage 45 and a second current-shifter stage 46, and a first output-current mirror 47 and a second output-current mirror 48.

In greater detail, the first differential input stage 44 is formed by: a first pair of N-channel MOS transistors 50a, 50b, having control terminals coupled, respectively, to the first input terminal 41 and to the second input terminal 42 of the error-amplifier stage 22', and source terminals coupled to one another and to a first current generator 50c, which supplies a biasing current; and a second pair of P-channel MOS transistors 51a, 51b, which are diode-connected and have source terminals coupled to one another and to a supply voltage $V_{DD}$ of the circuit, drain terminals coupled to the drain terminal of a respective one of the MOS transistors 50a, 50b of the first pair of transistors, and control terminals coupled, respectively, to the first and second current-shifter stages 45, 46.

Each current-shifter stage 45, 46 is formed by a respective pair of PMOS transistors 45a, 45b and 46a, 46b. The transistors of each pair have source terminals coupled together and to the supply voltage $V_{DD}$ of the circuit, and drain terminals coupled together and to a respective current generator 45c, 46c. In particular, a first PMOS transistor 45a, 46a of each pair has a control terminal coupled to the control terminal of a respective one of the PMOS transistors 51a, 51b of the second pair of transistors of the differential input stage 44 (consequently, constituting a respective current-mirror connection), whilst a second PMOS transistor 45b, 46b of each pair is diode-connected and has a control terminal coupled, respectively, to the first output-current mirror 47 and to the second output-current mirror 48.

The first output-current mirror 47 is formed by the same second diode-connected PMOS transistor 45b of the first current shifter 45, and a second PMOS transistor 47b, which have gate and source terminals coupled to one another; the drain terminal of the second PMOS transistor 47b is coupled to the output terminal of the error-amplifier stage 22' and supplies the corresponding output source current.

The second output-current mirror 48 is formed by a first diode-connected NMOS transistor 48a and by a second NMOS transistor 48b, which have gate terminals coupled to one another, and source terminals coupled to one another and to the reference potential. The drain terminal of the first NMOS transistor 48a is coupled to the second current shifter 46 by interposition of an intermediate current mirror 52, whilst the drain terminal of the second NMOS transistor 48*b* is coupled to the output terminal of the error-amplifier stage 22' and supplies the corresponding output sink current.

The intermediate current mirror 52 in turn comprises a first PMOS transistor, in particular the second diode-connected PMOS transistor 46*b* of the second current shifter 46, and a second PMOS transistor 52*b*, which have gate and source terminals coupled to one another. The drain terminal of the second PMOS transistor 52*b* is coupled to the drain terminal of the first NMOS transistor 48*a* of the second output-current mirror 48.

In use, the first and second output-current mirrors 47, 48 increase the current capacity of the output stage of the transconductance-error amplifier 22*a*, so as to define the large-signal-operation regions $H_1$, $H_2$. By appropriately sizing the various transistors, and in particular by choosing an appropriate ratio, in terms of width/length (W/L) of the channel, between each transistor of the second pair of MOS transistors 51*a*, 51*b* and the associated first PMOS transistor 45*a*, 46*a* of the first current-shifter stage 45 or second current-shifter stage 46, it is possible to regulate the unbalancing of the input error signal $V_e$ for which the surplus of output current occurs. In this way, it is also possible to define and limit the width of the contiguous clamped regions $S_1$, $S_2$ at the sides of the linear-operation region L of the transconductance characteristic. In addition, the ratio of the transistors of the first and second output-current mirrors 47, 48 is chosen in such a way as to obtain the desired large-signal current capacity (respectively, source and sink current capacity) of the error-amplifier stage 22'.

In greater detail, each current-shifter stage 45, 46 starts to deviate the biasing current supplied by the reference generator 50*c*, and to supply it at output to the error-amplifier stage 22' (respectively, as a source or sink current), starting from the value (designated by $Vsat_{max}$) of the input error signal $V_e$ such that the current that flows in the corresponding first PMOS transistor 45*a*, 46*a* becomes less than the current supplied by the respective current generator 45*c* or 46*c*, designated by $i_{ref}$. In particular, the value $Vsat_{max}$ corresponds, in absolute value, to the upper limit of the clamped regions $S_1$, $S_2$, or, equivalently, to the start of the large-signal-operation regions $H_1$, $H_2$.

The difference between the current supplied by the first PMOS transistor 45*a* or by the second PMOS transistor 46*a* and the current supplied by the corresponding current generator 45*c* or 46*c* is deviated in the corresponding first output-current mirror 47 or second output-current mirror 48, and then multiplied so as to obtain the desired value for the source current or sink current.

It may be found that the aforesaid value $Vsat_{max}$ is given, in absolute value, by the following equation:

$$Vsat_{max} = \frac{2 \cdot i_{ref} \cdot W_1/L_1}{gm_{50}|_{min} \cdot W_2/L_2}$$

where $gm_{50|min}$ is the smallest transconductance between the MOS transistors 50*a* or 50*b* of the first differential input stage 44 (given that the input stage is unbalanced, the two transistors are not traversed by the same current, and hence, albeit having the same size, have different transconductance), and $W_1/L_1$ and $W_2/L_2$ are the ratios between the channel widths and lengths, respectively, of the MOS transistor 51*a* of the first differential input stage 44 and of the associated first PMOS transistor 45*a* of the first current-shifter stage 45 (which are assumed equal to the same ratios between the channel widths and lengths, respectively, of the MOS transistor 51*b* and of the associated first PMOS transistor 46*a* of the second current-shifter stage 46). For example, the ratio between $W_1/L_1$ and $W_2/L_2$ may be chosen equal or approximately equal to 0.23.

With reference to FIG. 7, the transconductance amplifier 22*a* comprises a second differential input stage 60, and an output stage 61. The second differential input stage 60 is formed by a pair of N-channel MOS transistors 60*a*, 60*b*, having control terminals coupled, respectively, to the first and second input terminals 41, 42 of the error-amplifier stage 22', and source terminals coupled to one another and to a second current generator 60*c*, which supplies a biasing current I. The output stage 61 comprises a third output-current mirror 64, coupled to the MOS transistor 60*a*, a fourth output-current mirror 65, coupled to the MOS transistor 60*b*, and a fifth output-current mirror 66.

In greater detail, the third and fourth output-current mirrors 64, 65 are formed by a respective first, diode-connected, PMOS transistor 64*a*, 65*a*, and by a respective second PMOS transistor 64*b*, 65*b*, which have gate terminals coupled to one another and source terminals coupled to one another and to the supply voltage $V_{DD}$ of the circuit. The drain terminals of the first PMOS transistor 64*a*, 65*a* of the third and fourth output-current mirrors 64, 65 are coupled, respectively, to the MOS transistor 60*a* and 60*b* of the second differential input stage 60, whilst the drain terminals of the second PMOS transistor 64*b*, 65*b* are coupled to the fifth output-current mirror 66.

The fifth output-current mirror 66 in turn comprises a first, diode-connected, NMOS transistor 66*a*, and a second NMOS transistor 66*b*, which have gate and source terminals coupled to one another. The drain terminal of the first NMOS transistor 66*a* is coupled to the drain terminal of the second PMOS transistor 64*b* of the third output-current mirror 64, whilst the drain terminal of the second NMOS transistor 66*b* is coupled to the drain terminal of the second PMOS transistor 65*b* of the fourth output-current mirror 65, and to the output of the error-amplifier stage 22'.

The transconductance amplifier 22*a* further comprises an unbalancing-current stage, formed by a feedback-current mirror 68 and by a second feedback-current mirror 69 and configured so as to define the clamped regions $S_1$, $S_2$ of the transconductance characteristic.

The first feedback-current mirror 68 comprises a first PMOS transistor, in particular the first, diode-connected, PMOS transistor 64*a* of the third output-current mirror 64, and a second PMOS transistor 68*b*, which have gate and source terminals coupled to one another. The drain terminal of the second PMOS transistor 68*b* is coupled to the drain terminal of the first PMOS transistor 65*a* of the fourth output-current mirror 65. In turn, the second feedback-current mirror 69 comprises a first PMOS transistor, in particular the first, diode-connected, PMOS transistor 65*a* of the fourth output-current mirror 65, and a second PMOS transistor 69*b*, which have gate and source terminals coupled to one another. The drain terminal of the second PMOS transistor 69*b* is coupled to the drain terminal of the first PMOS transistor 64*a* of the third output-current mirror 64.

In use, the third and fourth output-current mirrors 64, 65 amplify (in a standard way) the current flowing in the corresponding PMOS transistor 64*a*, 65*a*. The fifth output-current mirror 66 enables conversion of the differential outputs of the second PMOS transistor 64*b* of the third output-current mirror 64 and of the first NMOS transistor 66*a* of the fifth output-current mirror 66, into a single output, which is the output of the error differential stage 22'.

The additional presence of the first feedback-current mirror 68 and of the second feedback-current mirror 69, and in particular of the PMOS transistors 68b and 69b, introduces a positive feedback in the load of the second differential input stage 60, which causes a nearly complete unbalancing of the differential branches of the second differential input stage 60 for a smaller input voltage (error signal $V_e$), as compared to the case where the feedback-current mirrors were not used. In particular, when the error signal $V_e$ is such as to unbalance the differential branches in such a way that the voltage between the gate and source terminals of one of the PMOS transistors 68b and 69b of the first and second feedback-current mirrors 68, 69 will equal the threshold voltage of the same transistor, one between the first feedback-current mirror 68 and the second feedback-current mirror 69 is deactivated, consequently causing the aforesaid positive feedback to cease and subsequently causing a sharp decrease in the total transconductance of the transconductance amplifier 22a.

This unbalancing condition corresponds to the clamped regions $S_1$ and $S_2$ shown in FIG. 5a. The value $Vsat_{min}$ of the input error signal $V_e$ whereby the aforesaid condition arises, which corresponds in absolute value to each of the boundary points of the clamped regions $S_1$ and $S_2$ and of the linear-operation region L, is approximately given by the following expression:

$$Vsat_{min} = \frac{I(1-k)}{gm_{60}(1+k)}$$

where $gm_{60}$ is the transconductance value of the MOS transistors 60a, 60b of the second differential input stage 60, and k is the aspect ratio (W/L) of the pair of transistors of the first and second feedback-current mirrors 68, 69. Consequently, by appropriately sizing the transistors of the transconductance amplifier 22a, it is possible to regulate the width of the linear-operation region L and of the clamped regions $S_1$ and $S_2$.

An embodiment of the voltage converter described and of a corresponding method for controlling the output voltage may have a number of advantages.

The use of an appropriate filtering of the sampled feedback signal and of an appropriate transconductance characteristic for the error-amplifier stage makes it possible to act on the following parameters of the voltage converter:
  the effectiveness of the regulation of the output voltage $V_{out}$ in a wide range of load currents, in particular by means of an appropriate choice of the pulse duration $T_c$, and of the time constant of the RC-series stage 34 of the switched-capacitor filter of the averager stage 32; and
  the rapidity of response to sudden load variations and the immunity to sampling noise, in particular by means of an appropriate choice of the maximum sink and source currents of the error-amplifier stage 22' and of the width of the clamped regions $S_1$, $S_2$, contiguous to the linear-operation region L in the corresponding transconductance characteristic.

In particular, the use of an embodiment of the voltage converter may be particularly advantageous in a battery-charger device, for supplying a regulated output voltage (for example, equal to 12 V) starting from the mains voltage.

Finally, modifications and variations may be made to what is described and illustrated herein without thereby departing from the spirit and scope of the present disclosure.

In particular, it is emphasized that the filtering of the sampled feedback signal and the use of the transconductance characteristic described can act independently on the regulation parameters of the voltage converter. Their combined use may be, however, particularly advantageous to obtain the advantages previously discussed.

In addition, the feedback signal $V_{fb}$, correlated to the value of the output voltage $V_{out}$, could be taken, in the voltage converter 30, directly from the primary winding 5 on the primary side of the transformer. In this case, the auxiliary winding 7 might not be provided, or else it could be used only for providing the self-supply for the control circuit 12' (the control method described remaining, however, unchanged).

The CCE block 22b in the error-amplifier stage 22' may not be provided, in the case where the application does not require high source and sink currents. In addition, the transconductance characteristic of the error-amplifier stage 22' may only have one of the large-signal-operation regions $H_1$, $H_2$ (with high current), for example, the one ($H_2$) for high sink currents, and consequently only one saturation region contiguous to the linear-operation region L (in the example, the saturation region S2). This situation may arise in the case where the application does not require, for example, high source-current values at output, but only a high value of the sink current.

In addition, different values may be envisaged for the filter time constant $T_f$ of the RC-series stage 34, provided that they are higher than or equal to the pulse duration $T_c$. This is because pulse duration $T_c$ greater than the filter time constant $T_f$ may in fact cause instability of the control loop, rendering the effect of the low-pass filtering carried out by the averager stage 32 negligible.

It is highlighted that one or more embodiments of the present disclosure may find generic application in the voltage converters of a switching type with feedback on the primary winding and control of the peak current, hence being independent of: the particular type of converter (or regulator or power supply) used (even though in the description particular reference has been made to the flyback type); the modalities of energy transfer between the source and the load, at a fixed or variable switching frequency (for example, as a function of the output load); the particular circuit solution used for implementing the functionality of the individual blocks of the control circuit; the type of control switch; and the feedback modality envisaged on the primary side of the transformer.

Furthermore, one or more components of the voltage converter 30 may be disposed on an integrated circuit, such as a power supply controller. For example, some or all of the following components (FIG. 4) may be disposed on one or more such integrated circuits: diode 17, capacitor 16, resistors 13 and 14, compensator 24, sample and hold 20, stage 32, error amplifier 22', reference generator 23, controller stage 25, transistor 8, and resistor 11.

What is claimed is:

1. A voltage converter, comprising: a voltage-transformer having a primary side, designed to receive an input voltage, and a secondary side, designed to supply an output voltage; a control-switch coupled to said primary side; and a control circuit, coupled to a control terminal of said control-switch and configured to control switching thereof as a function of a first signal correlated to said output voltage; said control circuit including an error-amplifier stage, configured to process a difference between said first signal and a reference signal, wherein said error-amplifier stage is configured so as to have a transconductance characteristic with a linear-operation region, having a given slope, and at least one first clamped region, which has a slope lower than said given slope and is contiguous to said linear-operation region;
  wherein said first clamped region has a slope that is approximately zero and corresponds to an approximately constant value of an output current from said error-amplifier stage, as a voltage at input to said error-amplifier stage varies.

2. The converter according to claim 1, wherein said transconductance characteristic has: a first large-signal operation region and a second large-signal operation region, set laterally on opposite sides with respect to said linear-operation region and corresponding to high values of an output current from said error-amplifier stage, larger in absolute value than the values of said output current in said linear-operation region; said linear-operation region being separated from said first large-signal operation region by said first clamped region, and from said second large-signal operation region by a second clamped region, which is contiguous to said linear-operation region and has a slope lower than said given slope.

3. The converter according to claim 2, wherein said linear-operation region corresponds to a given range of values of a voltage at input to said error-amplifier stage, and said first large-signal operation region corresponds to input voltages having values higher than said given range, and said second large-signal operation region corresponds to input voltages having values lower than said given range.

4. The converter according to claim 1, wherein said error-amplifier stage comprises a transconductance amplifier, connected to the output of an averager stage and configured to define said first clamped region of said transconductance characteristic; said transconductance amplifier comprising: a first differential input stage having a first input and a second input, connected to respective inputs of said transconductance amplifier and a first differential branch and a second differential branch; a first output-current mirror and a second output-current mirror, connected to a respective one of said first and second differential branches and designed to supply an output current from said error-amplifier stage; and an unbalancing stage operatively coupled to said first and second differential branches and designed to cause an unbalancing of a current designed to flow in said first and second output-current mirrors, at said first clamped region.

5. The converter according to claim 4, wherein said transconductance characteristic has at least one first large-signal operation region, set at the side of said linear-operation region and corresponding to high values of an output current from said error-amplifier stage, higher in absolute value than values of said output current in said linear-operation region; and wherein said error-amplifier stage further comprises a current-capability enhancement block, connected to the output of said error-amplifier stage, and configured to define said first large-signal operation region of said transconductance characteristic; said current-capability enhancement block comprising: a second differential input stage having a first input, and a second input, connected to respective inputs of said transconductance amplifier; at least one first current-shifter stage, connected to an output of said differential input stage; and at least one first output-current mirror, connected to said first current-shifter stage and designed to supply said output current, starting from a value of a signal at input to said error-amplifier stage corresponding to the start of said first large-signal operation region.

6. The converter according to claim 1, further comprising: a sampling stage, designed to sample and hold a feedback signal correlated to said output voltage and to supply a sampled signal; and an averager stage, connected to the output of said sampling stage and designed to implement a filtering of said sampled signal, said first signal being a result of the filtering of said sampled signal.

7. A method for controlling a voltage converter, said converter being provided with: a voltage-transformer having a primary side receiving an input voltage and a secondary side supplying an output voltage; and a control-switch coupled to said primary side; said method comprising:
controlling switching of said control-switch means as a function of a first signal correlated to said output voltage, and said step of controlling comprising amplifying a difference between said first signal and a reference signal, wherein
said step of amplifying comprises implementing a transconductance characteristic with a linear-operation region, having a given slope, and at least one first clamped region, which has a slope lower than said given slope and is contiguous to said linear-operation region;
wherein said first clamped region has a slope that is approximately zero and corresponds to an approximately constant value of an output current, which is the result of said amplification step.

8. The method according to claim 7, wherein said step of controlling further comprises: sampling a feedback signal correlated to said output voltage for generating a sampled signal; and implementing a filtering of said sampled signal, said first signal being a result of the filtering of said sampled signal.

9. A regulator, comprising:
a sampler operable to generate a sample of a feedback signal that is related to a regulated signal;
an amplifier coupled to the sampler and operable to generate a control signal that is related to a difference between the sample and a reference signal, the amplifier having a first gain while the difference is between zero and a first value, the amplifier having a second gain while the difference is between the first value and a second value, a magnitude of the first gain being greater than a magnitude of the second gain and the amplifier having a third gain while the difference between the sample and the reference signal is between the second value and a third value, a magnitude of the third gain being greater than a magnitude of the second gain; and
a driver coupled to the amplifier and operable to generate from the control signal a drive signal that is operable to cause the regulated signal to be generated.

10. The regulator of claim 9 wherein:
the sample comprises a sample voltage; and
the reference signal comprises a reference voltage.

11. The regulator of claim 9, further comprising:
wherein the amplifier includes an output node on which the amplifier generates the control signal; and
a frequency-compensation network coupled to the output node of the amplifier.

12. The regulator of claim 9 wherein the second gain is approximately constant.

13. The regulator of claim 9 wherein the first gain is approximately constant.

14. The regulator of claim 9 wherein the second gain is approximately zero.

15. The regulator of claim 9 wherein the magnitude of the third gain is greater than the magnitude of the first gain.

16. The regulator of claim 9 wherein:
the first and second gains are negative; and
the second gain is greater than the first gain.

17. The regulator of claim 9 wherein:
the first and second gains are positive; and
the second gain is less than the first gain.

18. The regulator of claim 9 wherein generating the control signal comprises generating the control signal having a substantially constant signal component while the difference is between the first and second values.

19. The regulator of claim 9, further comprising a filter disposed between the sampler and the amplifier, operable to filter the sample from the sampler, and operable to provide the filtered sample to the amplifier.

20. A power supply, comprising:
an output node operable to provide a regulated voltage;
primary and secondary reference nodes;
an input node operable to receive an input voltage;
a transformer having a first primary tap coupled to the input node, a second primary tap, a third primary tap, a fourth primary tap coupled to the primary reference node, a first secondary tap coupled to the output node, and a second secondary tap coupled to the second reference node;
a switch having a first conduction node coupled to the second primary tap, a second conduction node coupled to the primary reference node, and a control node; and
a regulator, comprising,
    a sampler coupled to the third primary tap and operable to generate a feedback sample,
    an amplifier coupled to the sampler and operable to generate a control signal that is related to a difference between the sample and a reference signal, the amplifier having a first gain while the difference is between zero and a first value, and the amplifier having a second gain while the magnitude of the difference is greater than a magnitude of the first value, a magnitude of the first gain being greater than a magnitude of the second gain, and
    a driver coupled to the amplifier and operable to generate from the control signal a drive signal on the control node of the switch.

21. The power supply of claim 20 wherein the regulator is disposed on an integrated circuit.

22. The power supply of claim 20 wherein the regulator and the switch are disposed on an integrated circuit.

23. The power supply of claim 20, further comprising a voltage divider disposed between the third primary tap and the sampler.

24. The power supply of claim 20, further comprising:
a sense element coupled between the second conduction node of the switch and the secondary reference node and operable to generate a sense signal; and
wherein the driver is coupled to the sense element and is operable to generate the drive signal related to a difference between the control signal and the sense signal.

25. The power supply of claim 20, further comprising:
a diode coupled to the third primary tap; and
a capacitor coupled between the diode and the secondary reference node.

26. The power supply of claim 20, further comprising a diode coupled between the first secondary tap and the output node.

27. The power supply of claim 20 wherein the transformer further comprises:
a primary winding disposed between the first and second primary taps;
an auxiliary winding disposed between the third and fourth primary taps; and
a secondary winding disposed between the first and second secondary taps.

28. A system, comprising
a power supply, comprising,
    an output node operable to provide a regulated voltage,
    primary and secondary reference nodes,
    an input node operable to receive an input voltage,
    a transformer having a first primary tap coupled to the input node, a second primary tap, a third primary tap, a fourth primary tap coupled to the primary reference node, a first secondary tap coupled to the output node, and a second secondary tap coupled to the second reference node,
    a switch having a first conduction node coupled to the second primary tap, a second conduction node coupled to the primary reference node, and a control node, and
    a regulator, comprising,
        a sampler coupled to the third primary tap and operable to generate a feedback sample,
        an amplifier coupled to the sampler and operable to generate a control signal that is related to a difference between the sample and a reference signal, the amplifier having a first gain while the difference is between zero and a first value, and the amplifier having a second gain while the difference is greater than a magnitude of the first value, a magnitude of the first gain being greater than a magnitude of the second gain, and
        a driver coupled to the amplifier and operable to generate from the control signal a drive signal on the control node of the switch; and
a load coupled between the output node and the secondary reference node.

29. The system of claim 28 wherein the regulator and the load are disposed on respective integrated circuits.

30. The system of claim 28 wherein the regulator and the load are disposed on a same integrated circuit.

31. A method, comprising:
sampling a feedback signal that is related to a regulated signal on a node;
generating a control signal by amplifying a difference between the sampled feedback signal and a reference signal with a first gain if the difference is between zero and a first value and with a second lower gain if the difference is between the first value and a second value;
periodically coupling the node to an input signal in response to the control signal.

32. The method of claim 31 wherein a magnitude of the second gain is substantially constant.

33. The method of claim 31 wherein the first gain is substantially constant.

34. The method of claim 31 wherein the second gain is substantially zero.

35. The method of claim 31 wherein the amplifier has a third gain while the difference between the sample and the reference signal is between the second value and a third value.

36. The method of claim 31 wherein:
the first and second gains are negative; and
the second gain is greater than the first gain.

37. The method of claim 31 wherein:
the first and second gains are positive; and
the second gain is less than the first gain.

38. The method of claim 31 wherein generating the control signal comprises generating the control signal having a substantially constant component while the difference is between the first and second values.

39. The method of claim 31 wherein periodically coupling the node comprises:
periodically drawing a current through a primary winding of a transformer in response to a difference between the control signal and a signal that is related to the current; and transferring energy stored in the primary winding to a secondary winding of the transformer while substantially no current is being drawn through the primary winding, the secondary winding being coupled to the node.

40. The method of claim 31, further comprising generating the feedback signal with an auxiliary winding of the transformer by transferring energy stored in the primary winding to the auxiliary winding while substantially no current is being drawn through the primary winding.

* * * * *